L. L. KNOX & M. MURRAY.
OPEN HEARTH FURNACE.
APPLICATION FILED JAN. 20, 1908.
938,245.
Patented Oct. 26, 1909.
5 SHEETS—SHEET 2.
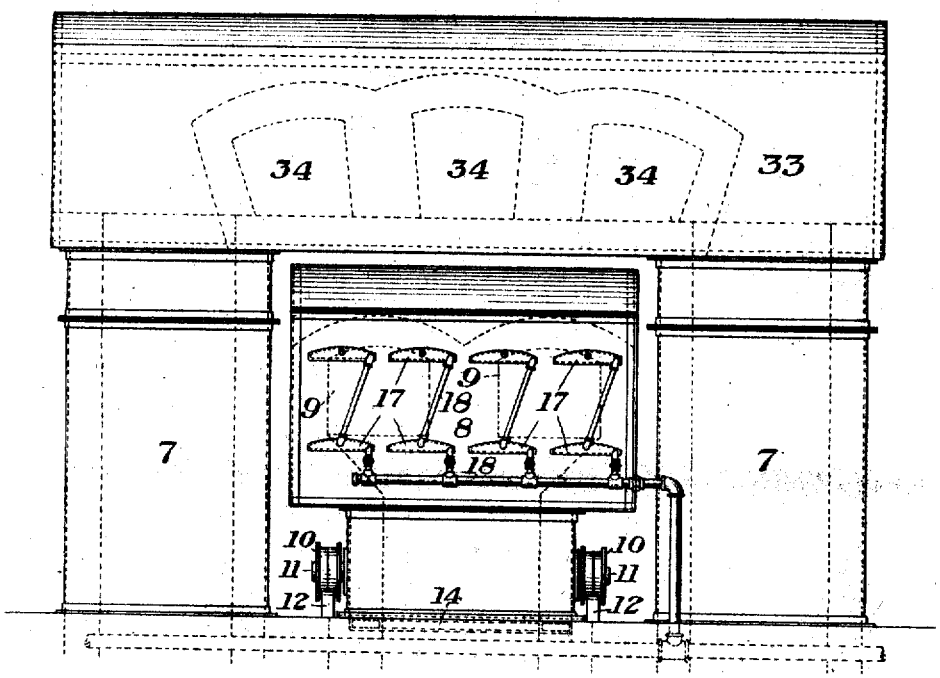
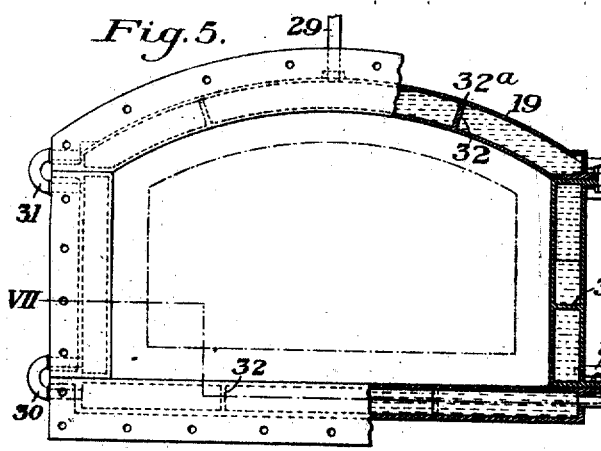
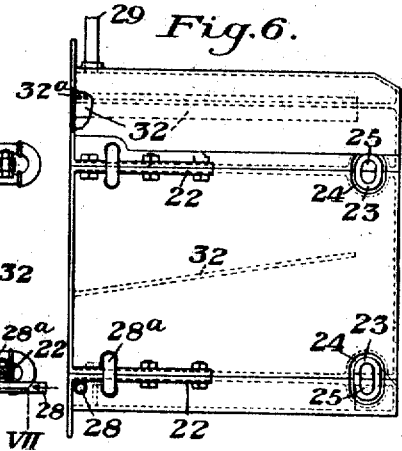
WITNESSES
INVENTORS L. L. KNOX & M. MURRAY.
OPEN HEARTH FURNACE.
APPLICATION FILED JAN. 20, 1908.
938,245.
Patented Oct. 26, 1909.
5 SHEETS—SHEET 3.
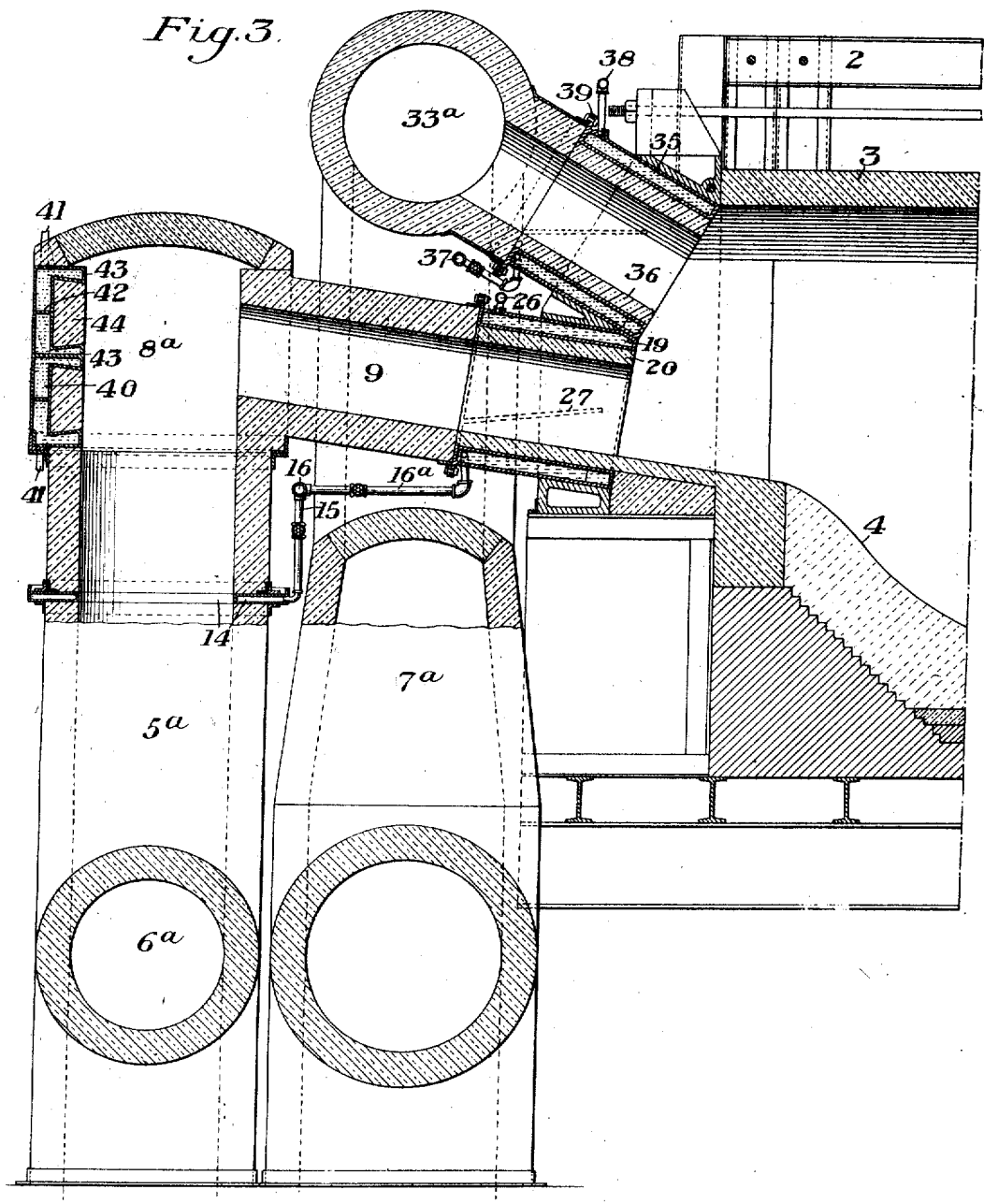

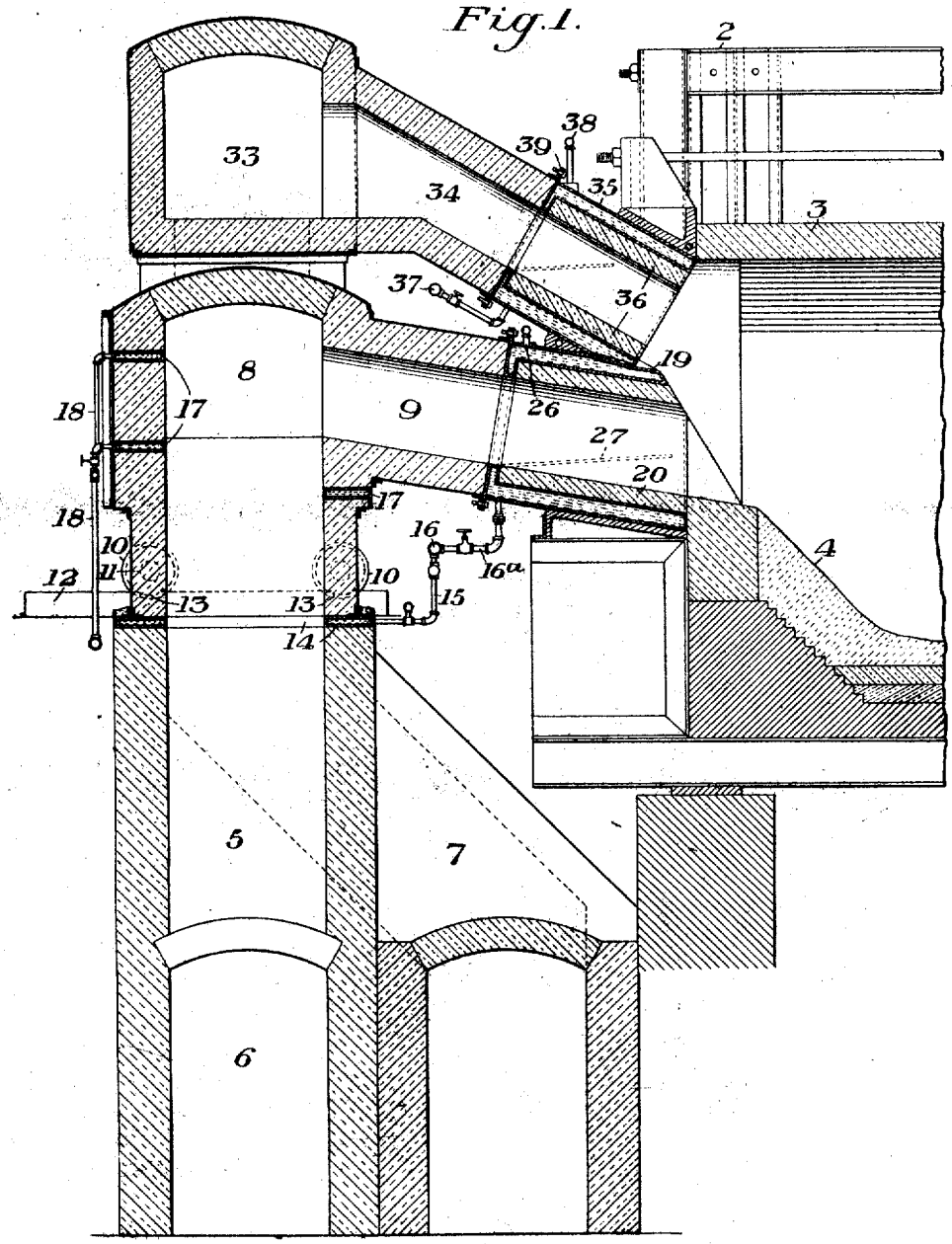

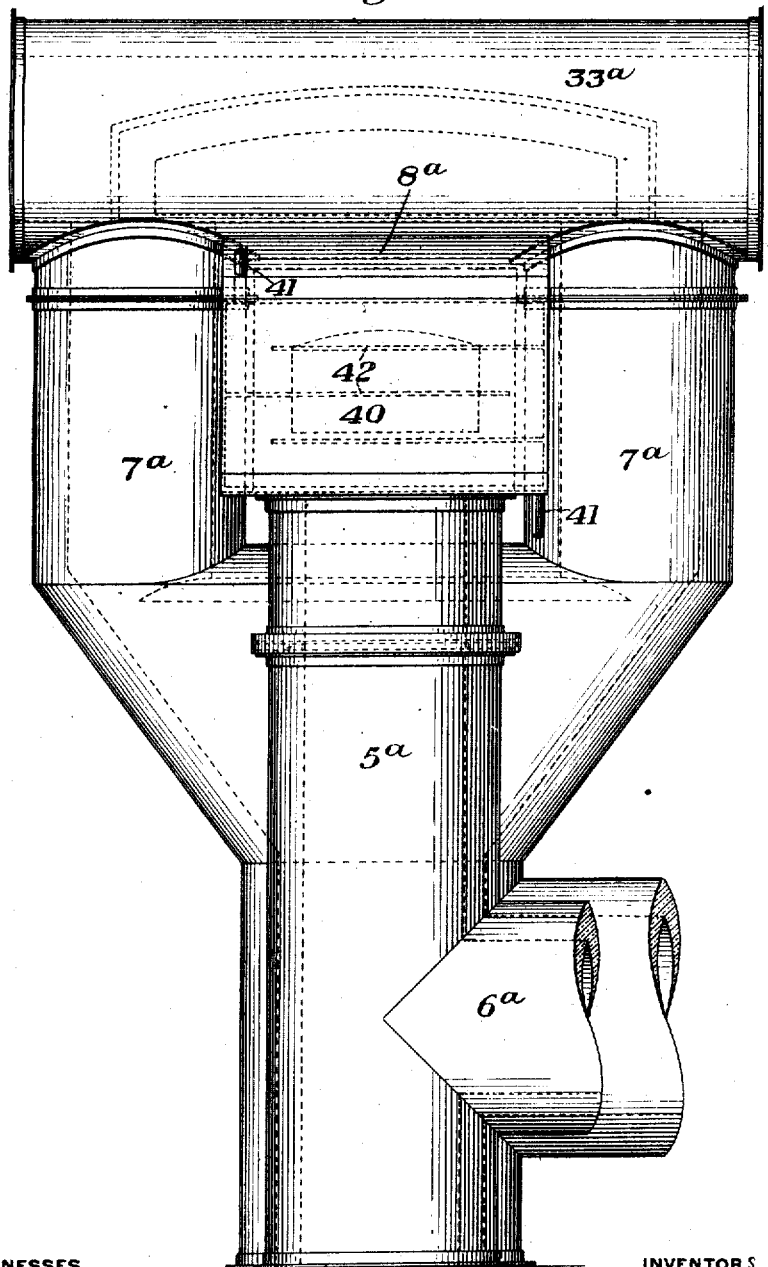

L. L. KNOX & M. MURRAY.
OPEN HEARTH FURNACE.
APPLICATION FILED JAN. 20, 1908.
938,245.
Patented Oct. 26, 1909.
5 SHEETS—SHEET 5.
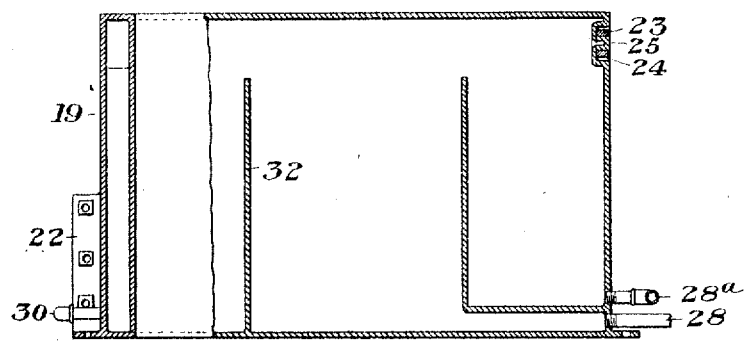
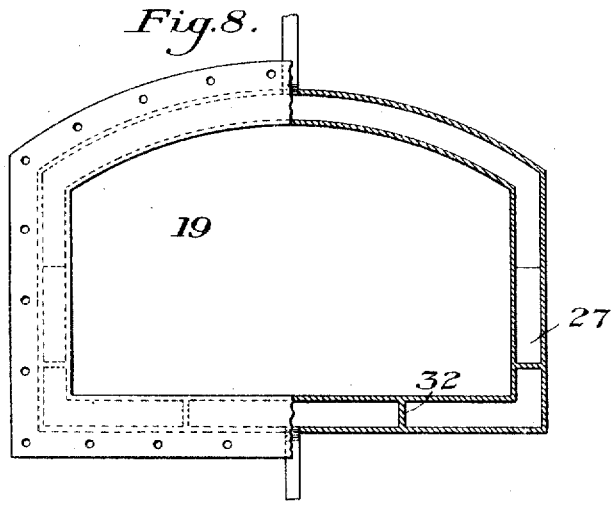
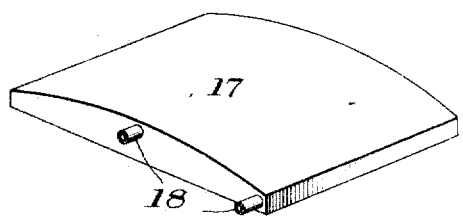
WITNESSES
INVENTORS

UNITED STATES PATENT OFFICE.

LUTHER L. KNOX, OF BEN AVON, AND MONTGOMERY MURRAY, OF WILKINSBURG, PENNSYLVANIA, ASSIGNORS TO KEYSTONE FURNACE CONSTRUCTION COMPANY, OF PITTSBURG, PENNSYLVANIA, A CORPORATION OF PENNSYLVANIA.

OPEN-HEARTH FURNACE.

938,245.  Specification of Letters Patent.  Patented Oct. 26, 1909.

Application filed January 20, 1908. Serial No. 411,586.

*To all whom it may concern:*

Be it known that we, LUTHER L. KNOX, of Ben Avon, Allegheny county, Pennsylvania, and MONTGOMERY MURRAY, of Wilkinsburg, Allegheny county, Pennsylvania, have invented a new and useful Open-Hearth Furnace, of which the following is a full, clear, and exact description, reference being had to the accompanying drawings, forming part of this specification, in which—

Figure 1 is a vertical section of one end portion of an open hearth furnace, showing one embodiment of our invention; Fig. 2 is an end view of the same; Fig. 3 is a view similar to Fig. 1 showing the modification; Fig. 4 is an end view of the furnace shown in Fig. 3; and Figs. 5, 6, 7, 8 and 9 are detail views showing the construction of different forms of water jackets or cooling frames which may be employed.

Our invention has relation to furnaces of the regenerative reversing type, and is designed to provide means of improved character for protecting the gas and air ports from the destructive action of the hot air and gases; and further to provide means whereby those parts of the furnace which are more subject to destructive action are rendered readily accessible for removal and renewal.

The precise nature of our invention will be best understood by reference to the accompanying drawings, in which we have shown a number of different embodiments of our invention, and which will now be described, it being premised, however, that the invention is susceptible of various other modifications by those skilled in the art without departing from the spirit and scope of the invention as defined in the appended claims.

Referring first to the form of our invention which is shown in Figs. 1 and 2, the numeral 2 designates the frame of an open hearth furnace, 3 the wall thereof, and 4 a portion of the hearth. 5 designates the gas port at one end of the furnace, 6 the slag pit or pocket, and 7 the air ports, one of which leads upwardly at each side of the gas port. The gas port leads upwardly into a box 8, having one or more twyer openings 9, two being shown. The box or chamber 8 is removably supported upon the top of the walls of the flue 5, and is provided with wheels 10 mounted on studs 11 at its opposite ends, which wheels are adapted to travel on the tracks 12, the wheels 10 normally resting in depressions 13 in said tracks. At the joint between the box or chamber 8 and the top of the flue 5 there is placed a water-cooled frame or casting 14, which is supplied with water by a pipe 15 leading from a supply pipe 16. A sealed joint at this point may effected by the use of clay or other cementitious material, with which the joint is luted. 17 designate cooling boxes, which are inset into the walls of the box or chamber 8 for the purpose of preventing or limiting the cutting away of the brickwork thereof by the hot gases. These boxes or plates are removably seated in the openings in which they rest, and are supplied with water by the circulating pipes 18.

The twyers 9 are extended from the box or chamber 8 to the furnace, and are each formed with a detachable end portion. These end portions consist of an outer water jacket 19 with a refractory inner lining 20. The water jackets 19 may consist of integral castings as shown in Fig. 8 or they may be made up of separate castings as shown in Figs. 5 and 6. In the latter case, the top portion of the jacket constitutes one section, the bottom portion and separate section, and the side portions two other sections. The side sections may be conveniently secured to the top and bottom sections by means of the bolting flanges 22, and also by means of the securing rings or clamps 23, which are seated in recesses 24 formed in the castings and engaging over portions 25 of the castings which project within said recesses (see Figs. 6 and 7). In the form shown in Fig. 1 the jacket is an integral casting, and water is admitted thereto from the supply pipe 16 by the branch pipe 16ª, and after circulating around the jacket passes out at the outlet pipe 26, any suitable arrangement of baffles 27 being provided within the jacket to cause a complete circulation of the water in contact with the entire wall surface thereof.

Where the jacket is made in separate sections, as shown in Figs. 5, 6 and 7, the water preferably enters the bottom section by way of the pipe 28 at the upper end of said section at or near its highest point, the water then dividing and a part passing by way of the U-connection 28ª into one of the side sections, and thence into the top section to the outlet 29, while the other part flows through the bottom section, and thence by the U-connection 30 into the other side section, and thence by the U-connection 31 into the top section. Each of the sections is provided with a suitable arrangement of bafflings 32 for causing a complete circulation of the water therein. By bringing the cold water into the lower section, at the highest point of the latter, we prevent the formation of steam pockets in said section, since any steam which forms in said section will work its way upwardly in said section to the cold water pipe. The baffles 32 in the top may also be perforated to permit escape of steam therethrough, as shown at 32ª in Figs. 5 and 6.

The air flues 7 at their upper ends lead into a transversely arranged air box or chamber 33, which is removably mounted on the top of the flue walls, and from which lead to the furnace a series of ports or twyers 34. These ports or twyers are also each provided with a detachable end portion consisting of a water jacket 35 and an inner refractory lining 36, the construction of the removable end portions of the air ports or twyers being of the same general character as the construction of the removable end portions of the gas ports or twyers.

37 designates the water supply pipe for the water jackets 35, and 38 the water outlet pipe.

The removable end portions of the air and gas ports and twyers may be conveniently secured to the main portions of the twyer walls by means of the bolting flanges 39.

It will be observed that those portions of the gas and air ports which are subjected to the greatest heat are entirely surrounded by a water jacket which will greatly reduce the destructive action of the heat and hot gases. Furthermore, that when these end portions have become burned out they can be readily detached and new ones put in place of them. In the case of the air ports or twyers this is effected by lifting off the entire box or chamber 33, thereby permitting access to the ends of the twyers. In the case of the gas ports or twyers, to effect the removal the box or chamber 8 is moved back on the tracks 12 sufficiently to withdraw the twyers and permit access to them.

The provision of the cooling boxes 17 in the walls of the gas box or chamber 8 greatly reduces the destructive action thereon and extends the life of the structure. Both the box 8 and box 33 can be readily removed and entirely replaced whenever necessary.

The construction shown in Figs. 3 and 4 is substantially the same as that shown in Fig. 1, except that the air and gas ports are of somewhat different form and arrangement, being intended for a furnace with one gas and one air port, there being but a single gas twyer leading to the furnace and a single air port or twyer. In this form also, in lieu of the cooling boxes 17 placed in the wall of the gas box 8ª, the front wall of said box is protected by means of the cooling plate 40 having water circulating pipes 41 and interior baffles 42. This plate 40 is formed with inwardly projecting dowel extensions 43, having inclined faces forming dovetails between which the brickwork 44 is set, the spaces between said projections forming pockets to hold and retain the brickwork. This construction permits the entire front walls of the box 8ª to be removed and renewed when necessary. In this form also the air box 33ª instead of being supported directly above the gas box or chamber in the form first described, is set closer to the furnace so that the gas box or chamber, as well as the air box or chamber, can be readily lifted off from its seat and removed.

It will be understood that each end of the furnace is provided with an arrangement of ports such as described, their arrangement at one end being a substantial duplicate of that at the other end.

We do not wish to limit ourselves to the particular construction and arrangement of parts which we have herein shown and described, as it will be obvious that various changes may be made therein. Thus, the cooling jackets and plates or boxes may be variously constructed and arranged, the baffling and its water-circulating connections therefor may be of any suitable character, and other modifications may be made.

The advantages of our invention will be apparent to those skilled in the art, since by the construction and arrangement described not only are all parts of the gas and air ports which are subjected to the most destructive action sufficiently protected by the water jackets or plates, but such parts are so located and arranged that they can be readily removed and renewed.

It will also be noted that the up-take flues for the gas and air have separate and independently constructed walls and that these up-take flues, together with the boxes which are removably supported at the upper ends of the same, and also the ports leading therefrom into the furnace, are surrounded by air so that they are air-cooled to a large extent. The walls of these up-takes are also constructed independently of the walls of the furnace.

While we have shown and described our invention in connection with an open hearth furnace, it will be obvious that it is equally applicable to other regenerative reversing furnaces.

We claim:—

1. A regenerative reversing furnace having gas and air up-take flues, separate gas and air boxes removably supported upon the upper ends of the respective up-take flues, and ports leading from said boxes through the wall of the furnace and into the furnace; substantially as described.

2. In a regenerative reversing furnace, a port or twyer connecting the up-take passage with the furnace chamber, said port or twyer having a detachable end portion consisting of a water-jacket said end portion extending through the furnace wall, and a refractory lining for said jacket; substantially as described.

3. In a regenerative furnace, a port, and a box or chamber mounted at the upper end of the port and having a twyer leading into the furnace, said twyer having a removable water-jacketed end portion the water jacket of which extends entirely around the port or twyer; substantially as described.

4. In a regenerative reversing furnace, an up-take flue, a box or chamber removably supported at the upper end of the flue, and a water-cooled port or twyer leading from said box or chamber into the furnace; substantially as described.

5. In a regenerative reversing furnace, a port, a box or chamber removably supported at the upper end of the port, and twyer leading from said box or chamber into the furnace, said twyer having a removable water-jacketed end portion; substantially as described.

6. A regenerative reversing furnace having separate removable gas and air boxes, said boxes having ports leading through the furnace wall and into the furnace; substantially as described.

7. A regenerative reversing furnace having separate removable gas and air boxes, said boxes having ports or twyers leading to the furnace and said ports or twyers having water-jacketed end portions; substantially as described.

8. A regenerative reversing furnace having removable gas and air boxes, said boxes having ports or twyers leading to the furnace, said ports or twyers having detachable water-jacketed end portions; substantially as described.

9. In a regenerative reversing furnace, a gas port, a water-cooled frame or casting seated on the upper end of the walls of said port, and a gas box or chamber removably seated on said box or frame said gas box or chamber having a twyer leading therefrom through the end wall of the furnace and into the furnace; substantially as described.

10. In a regenerative reversing furnace, an up-take passage, a box removably supported on the upper end of said flue and having a water-cooled twyer leading from the box through the furnace wall into the furnace, the said box also having its outer wall provided with water-cooling means; substantially as described.

11. In a regenerative reversing furnace, a twyer having a detachable end portion consisting of a water jacket formed of separable hollow sections secured together and entirely surrounding the twyer opening, and a refractory lining within said jacket; substantially as described.

12. In a regenerative reversing furnace, a twyer having a detachable end portion consisting of a water jacket composed of separate sections detachably secured to each other, and an inner refractory lining, together with means for circulating water through said sections; substantially as described.

13. A regenerative reversing furnace, having a stationary furnace body, and having air and gas up-takes constructed with separate and independent walls, and a separate air-surrounding port or twyer leading from each up-take through the end wall of the furnace and into the furnace; substantially as described.

14. A regenerative reversing furnace, having an up-take passage, and a port or twyer leading from the up-take passage through the end wall of the furnace and into the furnace, said port or twyer being exposed to the atmosphere for a considerable portion of its length for air-cooling, and also provided with water-cooling means; substantially as described.

15. A regenerative reversing furnace having gas and air up-takes, and separately constructed and separately removable ports connecting the up-takes with the furnace, said ports leading through the furnace wall into the furnace chamber; substantially as described.

16. A regenerative reversing furnace having gas and air up-takes whose walls are constructed separately of each other and also separately of the furnace walls, and separate gas and air boxes removably supported on the upper end of the up-takes and having ports or flues leading into the furnace chamber, said ports or flues having detachable water-cooled portions; substantially as described.

17. A regenerative reversing furnace having gas and air up-take flues, a transversely extending gas box supported on the upper end of the gas up-take flue, an air box removably supported on the upper end of the air up-take flues, and ports or twyers leading from said boxes through the end wall of the furnace and into the furnace chamber, said ports or twyers being removable with the boxes; substantially as described.

18. A regenerative reversing furnace having gas and air up-take flues, a gas box removably supported on the upper end of the gas up-take flue, a box removably supported on the upper end of the air up-take flues, and ports or twyers carried by said boxes and leading into the furnace chamber, the air box being supported above the gas box; substantially as described.

19. In a regenerative reversing furnace, removable separate air and gas twyers extending into the furnace chamber, and water-cooling means for the inner end portions of said ports or twyers said means extending between the adjacent ends of the twyers; substantially as described.

20. In a regenerative reversing furnace, an uptake having a flue leading to the furnace, the wall of said uptake opposite said flue having a water-cooled box or casting, said box or casting having inward projections, and a refractory lining supported by the said projections; substantially as described.

21. In a regenerative reversing furnace, an uptake having a flue leading to the furnace, the wall of said uptake opposite said flue having a water-cooled box or casting, said box or casting having inward projections, and a refractory lining supported by the said projections, said box or casting together with the lining being removable as a unit; substantially as described.

In testimony whereof, we have hereunto set our hands.

LUTHER L. KNOX.
MONTGOMERY MURRAY.

Witnesses:
GEO. H. PARMELEE,
H. M. CORWIN.

---

Correction in Letters Patent No. 938,245.

It is hereby certified that in Letters Patent No. 938,245, granted October 26, 1909, upon the application of Luther L. Knox, of Ben Avon, and Montgomery Murray, of Wilkinsburg, Pennsylvania, for an improvement in "Open-Hearth Furnaces," an error appears in the printed specification requiring correction as follows: Page 3, line 87, the compound word "air-surrounding" should read *air surrounded;* and that the said Letters Patent should be read with this correction therein that the same may conform to the record of the case in the Patent Office.

Signed and sealed this 11th day of October, A. D., 1910.

[SEAL.]

E. B. MOORE,
*Commissioner of Patents.* on the upper end of the air up-take flues, and ports or twyers carried by said boxes and leading into the furnace chamber, the air box being supported above the gas box; substantially as described.

19. In a regenerative reversing furnace, removable separate air and gas twyers extending into the furnace chamber, and water-cooling means for the inner end portions of said ports or twyers said means extending between the adjacent ends of the twyers; substantially as described.

20. In a regenerative reversing furnace, an uptake having a flue leading to the furnace, the wall of said uptake opposite said flue having a water-cooled box or casting, said box or casting having inward projections, and a refractory lining supported by the said projections; substantially as described.

21. In a regenerative reversing furnace, an uptake having a flue leading to the furnace, the wall of said uptake opposite said flue having a water-cooled box or casting, said box or casting having inward projections, and a refractory lining supported by the said projections, said box or casting together with the lining being removable as a unit; substantially as described.

In testimony whereof, we have hereunto set our hands.

LUTHER L. KNOX.
MONTGOMERY MURRAY.

Witnesses:
  GEO. H. PARMELEE,
  H. M. CORWIN.

---

It is hereby certified that in Letters Patent No. 938,245, granted October 26, 1909, upon the application of Luther L. Knox, of Ben Avon, and Montgomery Murray, of Wilkinsburg, Pennsylvania, for an improvement in "Open-Hearth Furnaces," an error appears in the printed specification requiring correction as follows: Page 3, line 87, the compound word "air-surrounding" should read *air surrounded;* and that the said Letters Patent should be read with this correction therein that the same may conform to the record of the case in the Patent Office.

Signed and sealed this 11th day of October, A. D., 1910.

[SEAL.]

E. B. MOORE,

*Commissioner of Patents.*

It is hereby certified that in Letters Patent No. 938,245, granted October 26, 1909, upon the application of Luther L. Knox, of Ben Avon, and Montgomery Murray, of Wilkinsburg, Pennsylvania, for an improvement in "Open-Hearth Furnaces," an error appears in the printed specification requiring correction as follows: Page 3, line 87, the compound word "air-surrounding" should read *air surrounded;* and that the said Letters Patent should be read with this correction therein that the same may conform to the record of the case in the Patent Office.

Signed and sealed this 11th day of October, A. D., 1910.

[SEAL.]

E. B. MOORE,
*Commissioner of Patents.*